(12) United States Patent
Fukushima (10) Patent No.: US 11,118,910 B2
(45) Date of Patent: Sep. 14, 2021

(54) ANGULAR SPEED DERIVATION DEVICE AND ANGULAR SPEED DERIVATION METHOD FOR DERIVING ANGULAR SPEED BASED ON OUTPUT VALUE OF TRIAXIAL GYRO SENSOR

(71) Applicant: JVC KENWOOD Corporation, Yokohama (JP)

(72) Inventor: Hidenori Fukushima, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 574 days.

(21) Appl. No.: 16/158,343

(22) Filed: Oct. 12, 2018

(65) Prior Publication Data
US 2019/0113348 A1    Apr. 18, 2019

(30) Foreign Application Priority Data

Oct. 13, 2017 (JP) .............................. JP2017-199793

(51) Int. Cl.
| | |
|---|---|
| G01C 21/18 | (2006.01) |
| G01C 21/20 | (2006.01) |
| G01C 21/16 | (2006.01) |
| G01C 21/00 | (2006.01) |

(52) U.S. Cl.
CPC ........... *G01C 21/18* (2013.01); *G01C 21/165* (2013.01); *G01C 21/20* (2013.01); *G01C 21/005* (2013.01)

(58) Field of Classification Search
CPC ...... C01C 21/005; G01C 21/165; G01C 21/20
See application file for complete search history.

(56) References Cited

FOREIGN PATENT DOCUMENTS

| | | | |
|---|---|---|---|
| JP | 09-042979 | | 2/1997 |
| JP | 09042979 A | * | 2/1997 |
| JP | 09318382 A | * | 12/1997 |
| JP | 2017102030 A | * | 6/2017 ............. G01C 25/00 |

* cited by examiner

*Primary Examiner* — Charles J Han
(74) *Attorney, Agent, or Firm* — Brundidge & Stanger, P.C.

(57) ABSTRACT

An updating unit updates an attitude represented by quaternion by defining an initial attitude represented by quaternion as an initial value, and successively substituting output values of the triaxial gyro sensor. A second converter converts the attitude represented by quaternion into an attitude in the Euler angle representation. An angular speed derivation unit derives an angular speed based on a time-dependent change in the attitude in the Euler angle representation. The output unit outputs an angular speed derived based on an output value of a monoaxial gyro sensor, when a difference between a pitch angle derived based on the output value of the triaxial acceleration sensor and the output value of the second converter and a pitch angle from the second converter is equal to or larger than a threshold value.

3 Claims, 10 Drawing Sheets

ANGULAR SPEED DERIVATION DEVICE AND ANGULAR SPEED DERIVATION METHOD FOR DERIVING ANGULAR SPEED BASED ON OUTPUT VALUE OF TRIAXIAL GYRO SENSOR

CROSS-REFERENCE TO RELATED APPLICATION

This application is based upon and claims the benefit of priority from the prior Japanese Patent Application No. 2017-199793, filed on Oct. 13, 2017, the entire contents of which is incorporated herein by reference.

BACKGROUND

1. Field

The present invention relates to an angular speed derivation technology and, more particularly, to an angular speed derivation device and an angular speed derivation method for deriving an angular speed based on an output value of a triaxial gyro sensor.

2. Description of the Related Art

Means provided in a vehicle-mounted navigation device to detect a current position of an automobile are categorized into autonomous (dead-reckoning) navigation using a distance sensor and an angular sensor and a satellite navigation using a global navigation satellite system (GNSS) receiver for receiving radio waves from a satellite. In the former means, the sensitivity of a gyro sensor drops when the vehicle is inclined as compared to when the vehicle is aligned with a horizontal axis. For this reason, an angle of inclination of a slope, i.e., a pitch angle, is derived based on outputs from a triaxial acceleration sensor and a speed sensor and an output of the gyro sensor is corrected by the pitch angle (see, for example, patent document 1).

[patent document 1] JP-A-Hei-9-42979

When a monoaxial gyro sensor is used, the sensitivity error caused by the roll and pitch of the gyro sensor may deteriorate the accuracy of detecting the position. To resolve the issue, it is effective to use a triaxial gyro sensor. The absolute attitude angle can be calculated by integrating the angular speed calculated based on the gyro sensor. Accordingly, the yaw angle that allows for the inclination of the sensor can be derived. However, errors included in the angular speed of the respective axes are also integrated into the absolute attitude angle. It is therefore desired to inhibit the accuracy of detecting the angular speed from becoming poor when a triaxial gyro sensor is used.

SUMMARY

An angular speed derivation device according to an embodiment can be installed in a mobile object, and includes: a first converter that converts an initial attitude in an Euler angle representation derived based on an output value of a triaxial acceleration sensor into an initial attitude represented by quaternion; an updating unit that updates an attitude represented by quaternion by defining the initial attitude represented by quaternion and derived from conversion in the first converter as an initial value, and repeatedly solving a differential equation of the attitude represented by quaternion by successively substituting output values of the triaxial gyro sensor into the differential equation; a second converter that converts the attitude represented by quaternion and updated by the updating unit into an attitude in the Euler angle representation; an angular speed derivation unit that derives an angular speed based on a time-dependent change in the attitude in the Euler angle representation derived from conversion in the second converter; an output unit that outputs the angular speed derived by the angular speed derivation unit; and a pitch angle derivation unit that derives a pitch angle based on the output value of the triaxial acceleration sensor and an output value of a speed sensor. The output unit outputs an angular speed derived based on an output value of a monoaxial gyro sensor instead of the angular speed derived by the angular speed derivation unit, when a difference between the pitch angle derived by the pitch angle derivation unit and a pitch angle in the attitude in the Euler angle representation derived from conversion in the second converter is equal to or larger than a threshold value.

Another embodiment relates to an angular speed derivation method. The is adapted for an angular speed derivation device that can be installed in a mobile object, and includes: converting an initial attitude in an Euler angle representation derived based on an output value of a triaxial acceleration sensor into an initial attitude represented by quaternion; updating an attitude represented by quaternion by defining the initial attitude represented by quaternion and derived from conversion in the first converter as an initial value, and repeatedly solving a differential equation of the attitude represented by quaternion by successively substituting output values of the triaxial gyro sensor into the differential equation; converting the attitude represented by quaternion as updated into an attitude in the Euler angle representation; deriving an angular speed based on a time-dependent change in the attitude in the Euler angle representation as derived; outputting the angular speed derived; and deriving a pitch angle based on the output value of the triaxial acceleration sensor and an output value of a speed sensor. The outputting outputs an angular speed derived based on an output value of a monoaxial gyro sensor, when a difference between the pitch angle derived based on the output value of the triaxial acceleration sensor and the output value of the speed sensor and a pitch angle in the attitude in the Euler angle representation derived from conversion is equal to or larger than a threshold value.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Embodiment 1

A summary of the prevent invention will be given before describing the invention in specific detail. An embodiment relates to an angular speed derivation device mounted in a vehicle, etc. and configured to derive an angular speed by using a triaxial gyro sensor. An angular speed derivation device updates an initial attitude derived by referring to a triaxial acceleration sensor with an output value of the triaxial gyro sensor and derives the angular speed from a difference between the updated attitude and previous attitude. An attitude angle is a synthesis of an inclination created when the triaxial gyro sensor is installed in the vehicle etc. and an inclination caused by a vehicle condition such as a slope or a bank. The attitude angle is ultimately defined relative to the three axes (vertical/sagittal/transversal) with reference to the horizontal ground level. The angular speed output from the triaxial gyro sensor is represented in a coordinate system defined with reference to the sensor itself and is not represented in a coordinate system defined with reference to the horizontal ground level. It is therefore necessary to convert the angular speed output from the triaxial gyro sensor to fit the coordinate system defined with reference to the horizontal ground level.

Thus, the attitude is derived by deriving the initial attitude from the output value from the triaxial acceleration sensor and updating the initial attitude with the angular speed output from the triaxial gyro sensor. The attitude can be represented in three methods including Euler angle, direction cosine matrix, and quaternion. For initial attitude and attitude, Euler angle is used. For an updating process, quaternion is used. In deriving an attitude angle based on the output value of the triaxial acceleration sensor, errors in the absolute attitude angle may be collected in deriving the initial attitude and in updating the attitude. Collection of errors lowers the accuracy of deriving the yaw angular speed. This embodiment is directed to the purpose of reducing an error in deriving the initial attitude and thereby inhibiting the accuracy of deriving the attitude angle and angular speed from becoming poor.

When a vehicle is at a stop, the translational acceleration and centripetal acceleration of the vehicle is 0 so that the initial attitude can be derived accurately. In the presence of an impact from vibration of a man-made structure like a bridge or vibration of the vehicle associated with a person getting on and off the vehicle, an associated acceleration component causes the accuracy of deriving the initial attitude to become poor. To address this, the angular speed derivation device according to the embodiment adjusts a period of time consumed for derivation of the initial attitude in accordance with the degree of variation in the attitude when the speed of the vehicle is lower than a threshold value.

Figure 1:
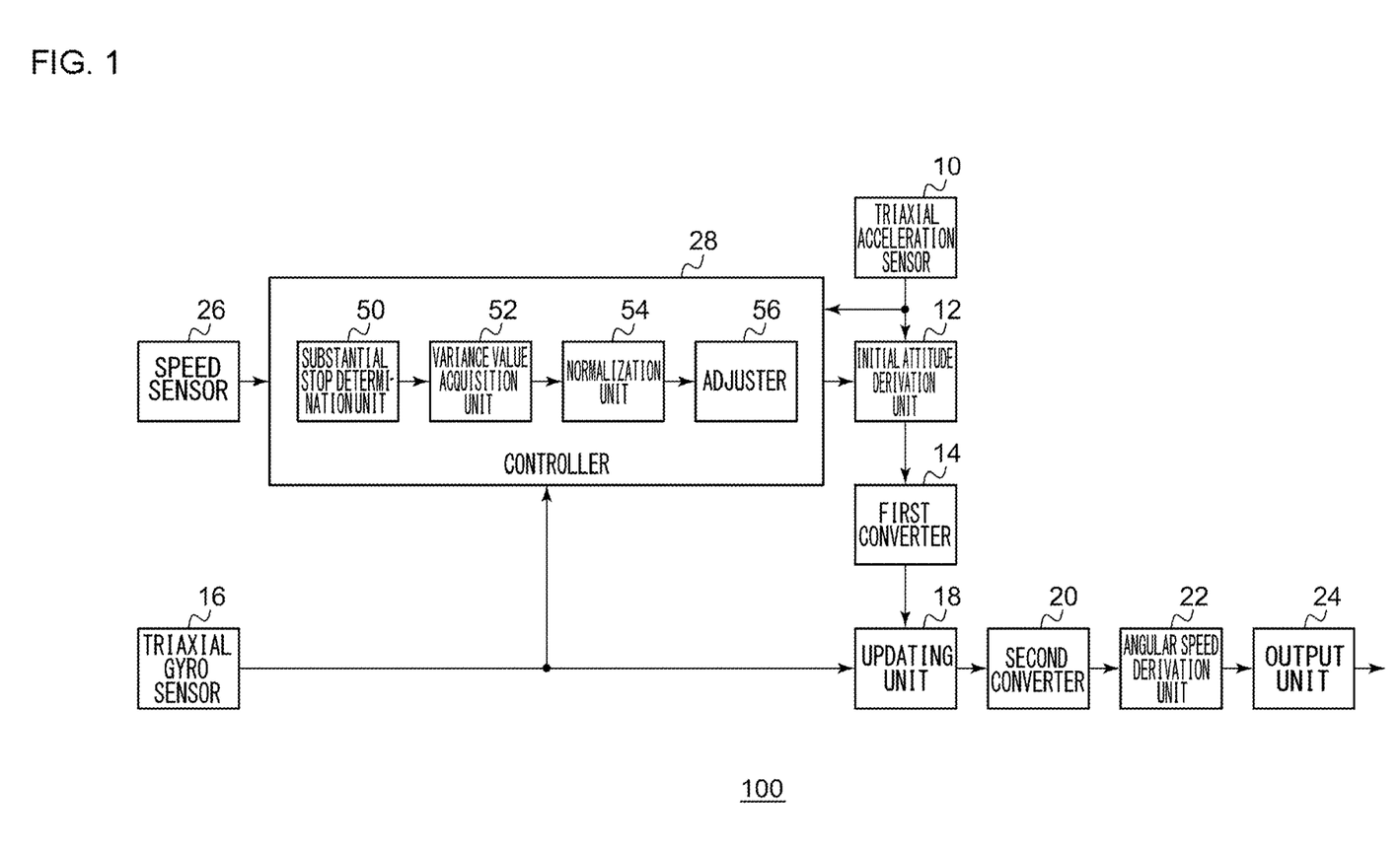
FIG. 1 shows a configuration of an angular speed derivation device according to Embodiment 1.

FIG. 1 shows a configuration of an angular speed derivation device 100 according to Embodiment 1. The angular speed derivation device 100 includes a triaxial acceleration sensor 10, an initial attitude derivation unit 12, a first converter 14, a triaxial gyro sensor 16, an updating unit 18, a second converter 20, an angular speed derivation unit 22, an output unit 24, a speed sensor 26, and a controller 28. Further, the controller 28 includes a substantial stop determination unit 50, a variance value acquisition unit 52, a normalization unit 54, and an adjuster 56. The angular speed derivation device 100 can be installed in a vehicle (not shown).

Figure 2:
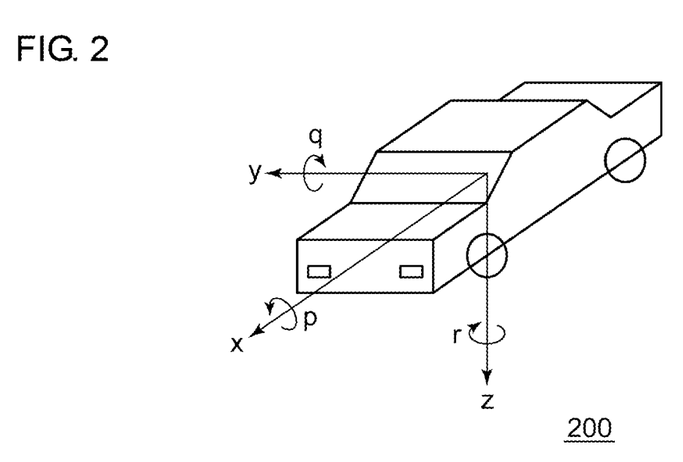
FIG. 2 shows a coordinate system according to Embodiment 1.

The triaxial acceleration sensor 10 measures an acceleration in the three axes respectively. FIG. 2 will be used to explain the three axes. FIG. 2 shows a coordinate system according to Embodiment 1. A quadrature coordinate system formed by three axes including an x-axis, y-axis, and z-axis is defined. The x-axis is oriented in a direction of travel of a vehicle 200, the z-axis is aligned with a downward normal direction from the floor level of vehicle 200, and the y-axis is oriented in a direction perpendicular to the x-axis and the z-axis. The triaxial acceleration sensor 10 acquires an acceleration $a_x$ in the x-axis direction, an acceleration $a_y$ in the y-axis direction, and an acceleration $a_z$ in the z-axis direction by making measurements. Reference is made back to FIG. 1. The triaxial acceleration sensor 10 outputs these to the initial attitude derivation unit 12 as an output value of the triaxial acceleration sensor 10.

The initial attitude derivation unit 12 receives the output value of the triaxial acceleration sensor 10. The initial attitude derivation unit 12 derives the initial attitude in the Euler angle representation based on the output value of the triaxial acceleration sensor 10. In the Euler angle representation, the angle of rotation around the x-axis is referred to as a roll angle φ, the angle of rotation around the y-axis is referred to as a pitch angle θ, and the angle of rotation around the z-axis is referred to as a yaw angle ψ. ψ and θ of the initial attitude are denoted as follows.

$$\phi = \tan^{-1}\left(\frac{a_y}{a_z}\right) \tag{1}$$

$$\phi = \tan^{-1}\left(\frac{a_x}{\sqrt{a_y^2 + a_z^2}}\right)$$

The initial value of ψ may be an arbitrary value and is set to, for example, "0".

The first converter 14 converts the initial attitude in the Euler angle representation derived by the initial attitude derivation unit 12 into the initial attitude represented by a direction cosine matrix, and then, converts the initial attitude represented by a direction cosine matrix into the initial attitude represented by quaternion. The initial attitude in the Euler angle representation is converted into a direction cosine matrix E as follows.

$$E = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix} \tag{2}$$

$$= \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix}$$

The components of the direction cosine matrix E are given below.

$$E = \begin{bmatrix} E_{11} & E_{12} & E_{13} \\ E_{21} & E_{22} & E_{23} \\ E_{31} & E_{32} & E_{33} \end{bmatrix} \quad (3)$$

A quaternion is defined by four components including unit vectors in the directions of rotation and an angle of rotation. The initial attitude represented by a direction cosine matrix E is converted into the initial attitude $q_1$, $q_2$, $q_3$, and $q_4$ in the quaternion representation as follows.

$$q_4 = \pm \frac{1}{2}\sqrt{1 + E_{11} + E_{22} + E_{33}} \quad (4)$$

$$q_1 = \frac{1}{4q_4}(E_{23} - E_{32})$$

$$q_2 = \frac{1}{4q_4}(E_{31} - E_{13})$$

$$q_3 = \frac{1}{4q_4}(E_{12} - E_{21})$$

The first converter 14 outputs the initial attitude $q_1$, $q_2$, $q_3$, and $q_4$ in the quaternion representation to the updating unit 18.

The triaxial gyro sensor 16 successively outputs angular speed vectors $\omega = [p \ q \ r]^T$ as the output value. The components p, q, and r are as shown in FIG. 2. The triaxial gyro sensor 16 successively outputs the output value to the updating unit 18.

The updating unit 18 solves the following differential equation of the next attitude in the quaternion representation.

$$\frac{d}{dt}\begin{bmatrix} q_1 \\ q_2 \\ q_3 \\ q_4 \end{bmatrix} = \frac{1}{2}\begin{bmatrix} 0 & r & -q & p \\ -r & 0 & p & q \\ q & -p & 0 & r \\ -p & -q & -r & 0 \end{bmatrix}\begin{bmatrix} q_1 \\ q_2 \\ q_3 \\ q_4 \end{bmatrix} \quad (5)$$

In the initial stage, the updating unit 18 substitutes the initial attitude $q_1$, $q_2$, $q_3$, and $q_4$ in the quaternion representation derived from conversion in the first converter 14 into the right side of the differential equation. The updating unit 18 also substitutes the components p, q, and r of the angular speed vector at that point of time into the right side of the differential equation. By solving the differential equation, the updating unit 18 derives the updated attitude $q_1$, $q_2$, $q_3$, and $q_4$ in the quaternion representation.

Subsequently, the updating unit 18 substitutes the derived attitude $q_1$, $q_2$, $q_3$, and $q_4$ in the quaternion representation into the right side of the differential equation and also substitutes the components p, q, and r of the new angular speed vector into the right side of the differential equation. By solving the differential equation, the updating unit 18 derives the attitude $q_1$, $q_2$, $q_3$, and $q_4$ in the quaternion representation again. In other words, the updating unit 18 updates the attitude $q_1$, $q_2$, a3, and $q_4$ in the quaternion representation by substituting the output values of the triaxial gyro sensor 16 successively and repeatedly solving the differential equation of the attitude in the quaternion representation. The updating unit 18 outputs the updated attitude $q_1$, $q_2$, $q_3$, and $q_4$ in the quaternion representation to the second converter 20.

The second converter 20 converts the attitude $q_1$, $q_2$, $q_3$, and $q_4$ in the quaternion representation updated by the updating unit 18 into the attitude represented by a direction cosine matrix E and then converts the attitude represented by the direction cosine matrix E into the attitude in the Euler angle representation. The updated attitude $q_1$, $q_2$, $q_3$, and $q_4$ in the quaternion representation is converted into the attitude represented by the direction cosine matrix E as follows.

$$E = \begin{bmatrix} q_1^2 - q_2^2 - q_3^2 + q_4^2 & 2(q_1q_2 + q_3q_4) & 2(q_1q_3 - q_2q_4) \\ 2(q_1q_2 - q_3q_4) & -q_1^2 + q_2^2 - q_3^2 + q_4^2 & 2(q_2q_3 + q_1q_4) \\ 2(q_1q_3 + q_2q_4) & 2(q_2q_3 - q_1q_4) & -q_1^2 - q_2^2 + q_3^2 + q_4^2 \end{bmatrix} \quad (6)$$

The direction cosine matrix E is converted into the attitude in the Euler angle representation as follows.

$$\phi = \tan^{-1}\frac{E_{23}}{E_{33}} \quad (7)$$

$$\theta = \tan^{-1}\frac{-E_{13}}{\sqrt{E_{23}^2 + E_{33}^2}}$$

$$\psi = \tan^{-1}\frac{E_{12}}{E_{11}}$$

Of the attitude in the Euler angle representation, the second converter 20 outputs the yaw angle it to the angular speed derivation unit 22.

Of the attitude in the Euler angle representation derived from conversion in the second converter 20, the angular speed derivation unit 22 receives the yaw angle $\psi$. The angular speed derivation unit 22 derives the angular speed based on the time-dependent change t [sec] in the yaw angle $\psi$. Given, for example, that the yaw angle of time n of interest is denoted by $\psi_n$ and the yaw angle at time n-1 is denoted $\psi n-1$, the angular speed is derived as $(\psi_n - \psi_{n-1})/t$. The output unit 24 outputs the angular speed derived by the angular speed derivation unit 22.

The speed sensor 26 is provided in the middle of a speed meter cable rotated in association with the rotation of the drive shaft and outputs a speed pulse signal in accordance with the rotation of the drive shaft. Further, the speed sensor 26 periodically detects the pulse count by counting speed pulse signals output in association with the movement of the vehicle at predetermined periods. The pulse count is in proportion to the speed of the vehicle 200. It can therefore be said that the speed sensor 26 measures the speed of the vehicle 200. The speed sensor 26 outputs the measured speed to the controller 28. The speed of the vehicle 200 may be acquired by a global navigation satellite system (GNSS) instead of the speed sensor 26.

The substantial stop determination unit 50 of the controller 28 receives information on the speed from the speed sensor 26. When the information indicates that the speed is lower than a threshold value (e.g., "0") over a predetermined period of time, the substantial stop determination unit 50 determines that the vehicle 200 is substantially at a stop. When the substantial stop determination unit 50 determines that the vehicle is substantially at a stop, the substantial stop determination unit 50 notifies the variance value acquisition unit 52 accordingly. The threshold value is set to a value with which it can be determined that the vehicle 200 is substantially at a stop. For example, a determination that the vehicle 200 is substantially at a stop can be made when the speed sensor 26 cannot detect pulses for a predetermined period of time.

When a notification is received from the substantial stop determination unit 50, the variance value acquisition unit 52 acquires a variance Var_gyro of the output value of the triaxial gyro sensor 16. The period over which a variance value is calculated is, for example, 10 seconds, and the sampling frequency is, for example, 10 [Hz]. This enables detection of a short-period change in the attitude of the vehicle 200. The variance value acquisition unit 52 outputs the variance value Var_gyro to the normalization unit 54.

The normalization unit 54 receives the variance value Var_gyro from the variance value acquisition unit 52. The normalization unit 54 maintains a variance TypVar_gyro of the output value of the triaxial gyro sensor 16 measured in advance through an experiment. The normalization unit 54 normalizes the variance value Var_gyro by dividing it by the variance TypVar_gyro. The normalization unit 54 outputs (Var_gyro/TypVar_gyro) to the adjuster 56.

The adjuster 56 receives (Var_gyro/TypVar_gyro) from the normalization unit 54. The adjuster 56 maintains an attitude angle derivation reference period Term_default determined in advance through an experiment. A period of time shorter than the time during which the temperature changes abruptly and longer than the time affected by white noise is set. For example, the period Term_default is set to three seconds. The adjuster 56 multiples the attitude angle derivation reference period Term_default by (Var_gyro/TypVar_gyro). The result of multiplication represents a period of time for derivation. In other words, the adjuster 56 adjusts the period of time for derivation such that the period of time consumed for derivation in the initial attitude derivation unit 12 is longer as the variance value of the output value of the triaxial gyro sensor 16 becomes large. When (Var_gyro/TypVar_gyro) is 1 or smaller, the period of time for derivation is configured to be Term_default. When the period of time for derivation exceeds 10 seconds, the period of time for derivation is configured to be 10 seconds. The adjuster 56 sets the period of time for derivation in the initial attitude derivation unit 12. The initial attitude derivation unit 12 averages the initial attitude over the period of time for derivation thus set.

This is equivalent to determining the period of time for derivation by using the normalized variance value of the angular speed. When the variance value of the angular speed is large, the attitude of the vehicle 200 changes in a short period and a noise component is introduced into the output value of the triaxial acceleration sensor 10. Therefore, the impact from a noise component is reduced by extending the period of time for derivation.

The variance value acquisition unit 52, the normalization unit 54, and the adjuster 56 may perform the following process. When a notification is received from the substantial stop determination unit 50, the variance value acquisition unit 52 acquires the variance value Var_accl of the output value of the triaxial acceleration sensor 10. The period of time over which a variance value is calculated is, for example, 10 seconds, and the sampling frequency is, for example, 10 [Hz]. This enables detection of a change in the attitude of the vehicle 200. The variance value acquisition unit 52 outputs the variance value Var_accl to the normalization unit 54.

The normalization unit 54 receives the variance value Var_accl from the variance value acquisition unit 52. The normalization unit 54 maintains a variance TypVar_accl of the output value of the triaxial acceleration sensor 10 measured in advance through an experiment. The normalization unit 54 normalizes the variance value Var_accl by dividing it by the variance TypVar_accl. The normalization unit 54 outputs (Var_accl/TypVar_accl) to the adjuster 56.

The adjuster 56 receives (Var_accl/TypVar_accl) from the normalization unit 54. The adjuster 56 maintains an attitude angle derivation reference period Term_default determined in advance through an experiment. A period of time shorter than the time during which the temperature changes abruptly and longer than the time affected by white noise is set. For example, the period of time Term_default is set to three seconds. The adjuster 56 multiples the attitude angle derivation reference period Term_default by (Var_accl/TypVar_accl). The result of multiplication represents a period of time for derivation. In other words, the adjuster 56 adjusts the period of time for derivation such that the period of time consumed for derivation in the initial attitude derivation unit 12 is longer as the variance value of the output value of the triaxial acceleration sensor 10 increases. When (Var_accl/TypVar_accl) is 1 or smaller, the period of time for derivation is configured to be Term_default. When the period of time for derivation exceeds 10 seconds, the period of time for derivation is configured to be 10 seconds. The adjuster 56 sets the period of time for derivation in the initial attitude derivation unit 12. The initial attitude derivation unit 12 averages the initial attitude over the period of time for derivation thus set. This is equivalent to determining the period of time for derivation by using the normalized variance value of the angular speed. That the variance value of the angular speed is large means that the attitude of the vehicle 200 has changed. Therefore, the accuracy is improved by extending the period of time for derivation.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 3:
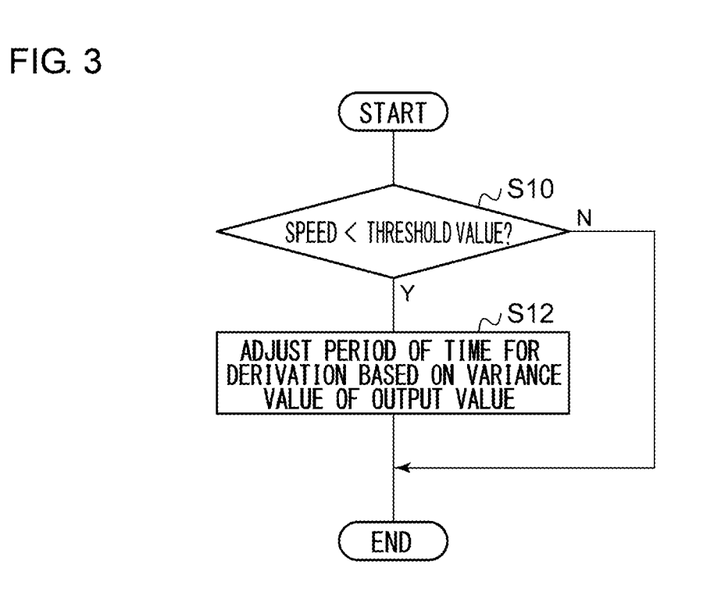
FIG. 3 is a flowchart showing steps for adjustment of a period of time for derivation by the angular speed derivation device of FIG. 1.

A description will be given of the operation of the angular speed derivation device 100 having the above configuration. FIG. 3 is a flowchart showing steps for adjustment of a period of time for derivation by the angular speed derivation device 100. When the speed is smaller than a threshold value (Y in S10), the adjuster 56 adjusts the period of time for derivation based on the variance value of the output value of the triaxial gyro sensor 16 or the variance value of the output value of the triaxial acceleration sensor 10 (S12). When the speed is not smaller than the threshold value (N in S10), step 12 is skipped.

According to this embodiment, the period of time for derivation of the initial attitude is adjusted based on the variance value of the output value of the triaxial acceleration sensor 10 when the speed of the vehicle 200 is lower than the threshold value. Therefore, the impact from vibration of the vehicle 200 is reduced. Further, the period of time for derivation of the initial attitude is adjusted based on the variance value of the output value of the triaxial gyro sensor 16 when the speed of the vehicle 200 is lower than the threshold value. Therefore, the impact from vibration of the vehicle 200 is reduced. Further, since the impact from vibration of the vehicle 200 is reduced, the accuracy of deriving the attitude is inhibited from becoming poor when the triaxial gyro sensor 16 is used. Since the accuracy of deriving the attitude is inhibited from becoming poor when the triaxial gyro sensor 16 is used, the accuracy of deriving the angular speed is inhibited from becoming poor when the triaxial gyro sensor 16 is used.

Further, since it is ensured that, when the speed of the vehicle 200 is lower than the threshold value, the period of time for derivation is extended as the variance value of the output value of the triaxial gyro sensor 16 becomes large, the impact from a noise component is reduced. Since the impact from a noise component is reduced, the accuracy of deriving the attitude is inhibited from becoming poor. Further, since it is ensured that, when the speed of the vehicle 200 is lower than the threshold value, the period of time for derivation is extended as the variance value of the output value of the triaxial acceleration sensor 10 becomes large, the accuracy of deriving the attitude is inhibited from becoming poor even if the attitude of the vehicle 200 changes.

Embodiment 2

A description will now be given of Embodiment 2. Like Embodiment 1, Embodiment 2 relates to an angular speed derivation device configured to derive an angular speed by using a triaxial gyro sensor. The embodiment is directed to the purpose of reducing errors in the attitude angle collected as the attitude is updated and inhibiting the accuracy of deriving the yaw angular speed from becoming poor due to the errors. When the initial attitude calculated from the output value of the triaxial acceleration sensor is updated by the output value of the triaxial gyro sensor, errors in the offset and sensitivity of the triaxial gyro sensor used in the calculation are collected as the time elapses. Accordingly, the accuracy of attitude becomes poor so that the accuracy of angular speed calculated from the difference thereof also becomes poor. Meanwhile, derivation of the angular speed from the output value of a monoaxial gyro sensor is affected by the angle of inclination of the detection axis caused by a change in the attitude of the vehicle so that the accuracy becomes poor.

In the angular speed derivation device according to the embodiment, the accuracy of deriving the angular speed is improved by selecting one of the two processes for deriving an angular speed that has a higher accuracy and performing the selected process. More specifically, a value of integral of absolute values of angular speed derived by using the output value of the triaxial gyro sensor is derived, starting at a point of time when the initial attitude is derived from the output value of the triaxial acceleration sensor. When the value of integral becomes equal to or larger than a threshold value, the angular speed derivation device outputs an angular speed derived from the output value of the monoaxial gyro sensor. A description will be given of the difference from the foregoing embodiment.

Figure 4:
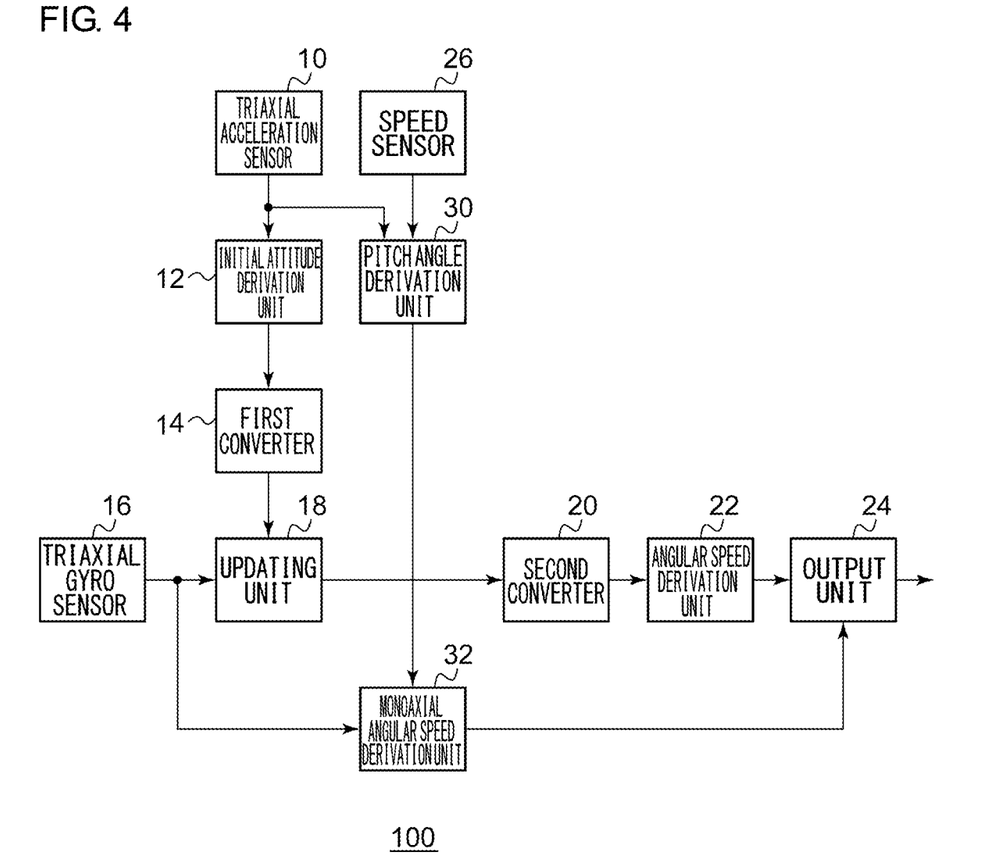
FIG. 4 shows a configuration of the angular speed derivation device according to Embodiment 2.

FIG. 4 shows a configuration of the angular speed derivation device 100 according to Embodiment 2. The angular speed derivation device 100 includes a triaxial acceleration sensor 10, an initial attitude derivation unit 12, a first converter 14, a triaxial gyro sensor 16, an updating unit 18, a second converter 20, an angular speed derivation unit 22, an output unit 24, a speed sensor 26, a pitch angle derivation unit 30, and a monoaxial angular speed derivation unit 32.

Figure 5:
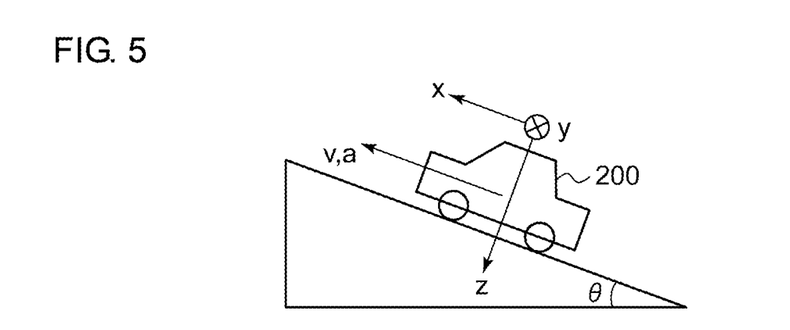
FIG. 5 shows a summary of the process in the pitch angle derivation unit of FIG. 4.

The pitch angle derivation unit 30 receives the output value of the triaxial acceleration sensor 10 and receives the output value of the speed sensor 26. The pitch angle derivation unit 30 derives a pitch angle θ of the vehicle 200 based on the received values. FIG. 5 shows a summary of the process in the pitch angle derivation unit 30. The x-axis, y-axis, and z-axis are defined as described above relative to the vehicle 200 traveling on a slope so that the triaxial acceleration sensor 10 acquires an acceleration $a_x$ in the x-axis direction, an acceleration $a_y$ in the y-axis direction, and an acceleration $a_z$ in the z-axis direction. The speed of the vehicle 200 output from the speed sensor 26 is oriented in the direction v. The pitch angle derivation unit 30 acquires an acceleration a by differentiating the speed v. The acceleration a is oriented in the same direction as the speed v. Denoting the gravitational acceleration by g, the relationship in FIG. 5 is given by the following.

$$a_x = a - q \sin \theta$$

$$a_y = 0$$

$$a_z = q \cos \theta \quad (8)$$

By solving these simultaneous equations, the inclination θ of the slope in FIG. 5 is derived. The inclination θ of the slope represents the pitch angle θ. The pitch angle derivation unit 30 outputs the pitch angle θ to the monoaxial angular speed derivation unit 32.

Of a set of output values of the triaxial gyro sensor 16, the monoaxial angular speed derivation unit 32 acquires the output value for one axis. Further, the monoaxial angular speed derivation unit 32 receives the pitch angle θ from the pitch angle derivation unit 30. The monoaxial angular speed derivation unit 32 derives the angular speed ω as given below.

$$\omega = \frac{Vout - Voffset}{S \cdot \sin \theta} \quad (9)$$

where Vout denotes the output value for one axis, Voffset denotes the offset value of the triaxial gyro sensor 16, and S (mv/deg/sec) denotes the sensitivity coefficient of the triaxial gyro sensor 16. The monoaxial angular speed derivation unit 32 outputs the angular speed ω to the output unit 24.

The output unit 24 receives the angular speed derived by the angular speed derivation unit 22 (hereinafter, also referred to as "triaxial angular speed"). Further, the output unit 24 receives the angular speed derived by the monoaxial angular speed derivation unit 32 (hereinafter, also referred to as "monoaxial angular speed"). Once the initial attitude is derived by the initial attitude derivation unit 12, the output unit 24 starts calculating a value of integral of absolute values of the triaxial angular speed. When the value of integral is smaller than a threshold value, the output unit 24 outputs the triaxial angular speed. Meanwhile, when the value of integral is equal to or larger than the threshold value, the output unit 24 outputs the monoaxial angular speed instead of the triaxial angular speed. When a new initial attitude is derived by the initial attitude derivation unit 12, the output unit 24 rests the value of integral.

Figure 6:
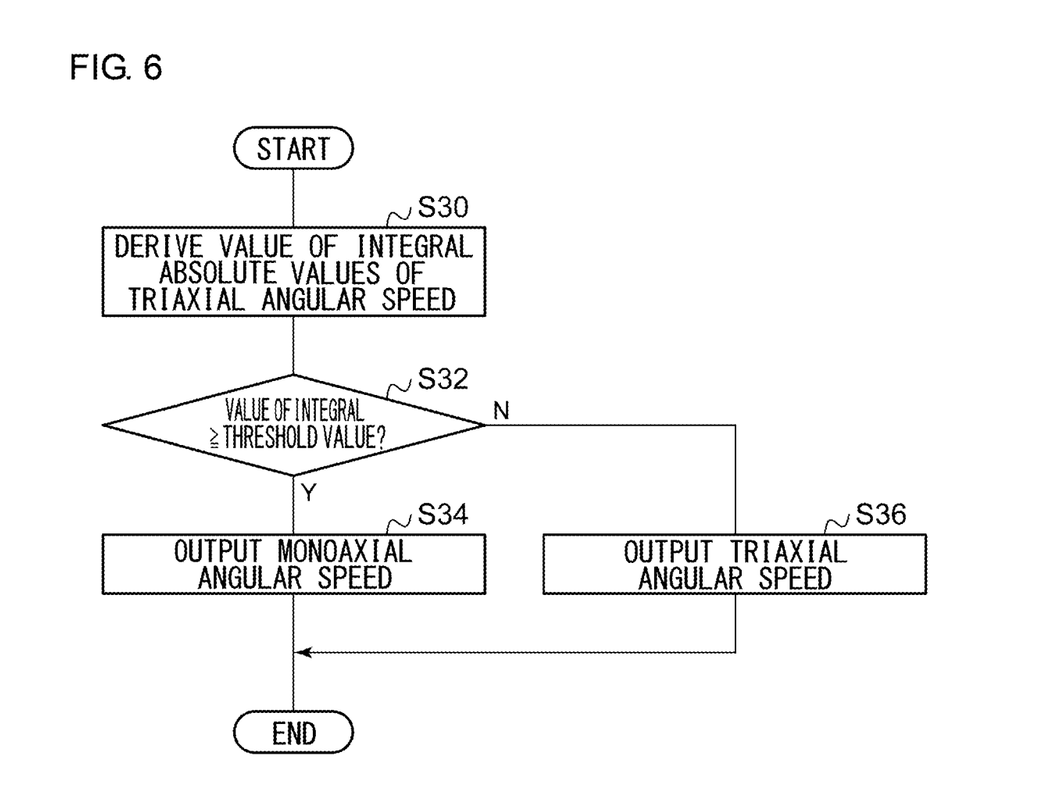
FIG. 6 is a flowchart showing steps for switching by the angular speed derivation device of FIG. 4.

A description will be given of the operation of the angular speed derivation device 100 having the above configuration. FIG. 6 is a flowchart showing steps for switching by the angular speed derivation device 100. The output unit 24 derives a value of integral of absolute values of the triaxial angular speed (S30). When the value of integral is equal to or larger than a threshold value (Y in S32), the output unit 24 outputs a monoaxial angular speed (S34). When the value of integral is not equal to or larger than the threshold value (N in S32), the output unit 24 outputs a triaxial angular speed (S36).

According to this embodiment, an increase in errors integrated in the process of updating the attitude is detected by comparing the value of integral of absolute values of the triaxial angular speed with the threshold value. Since the monoaxial angular speed is output instead of the triaxial angular speed when the value of integral of absolute values of the triaxial angular speed is equal to or larger than the threshold value, the output of triaxial angular speed affected by an error in the attitude is avoided. Since the output of triaxial angular speed affected by an error in the attitude is avoided, the accuracy of deriving the angular speed output is inhibited from becoming poor. Since the monoaxial angular speed is output, an error in the yaw angular speed caused by an error in the absolute attitude angle collected in the attitude is reduced.

Embodiment 3

A description will now be given of Embodiment 3. Like the foregoing embodiments, Embodiment 3 relates to an angular speed derivation device configured to derive an angular speed by using a triaxial gyro sensor. Like Embodiment 2, Embodiment 3 is directed to the purpose of reducing errors in the attitude angle collected as the attitude is updated and inhibiting the accuracy of deriving the yaw angular speed from becoming poor due to the errors. In the angular speed derivation device according to Embodiment 3, as in the device of Embodiment 2, the accuracy of deriving the angular speed is improved by selecting one of the two processes for deriving an angular speed that has a higher accuracy and performing the selected process. More specifically, the initial attitude is derived from the output value of the triaxial acceleration sensor and then a variation in the temperature is derived. When the variation in the temperature becomes equal to or larger than a threshold value, the angular speed derivation device outputs an angular speed derived from the output value of the monoaxial gyro sensor. A description will be given of the difference from the foregoing embodiment.

Figure 7:
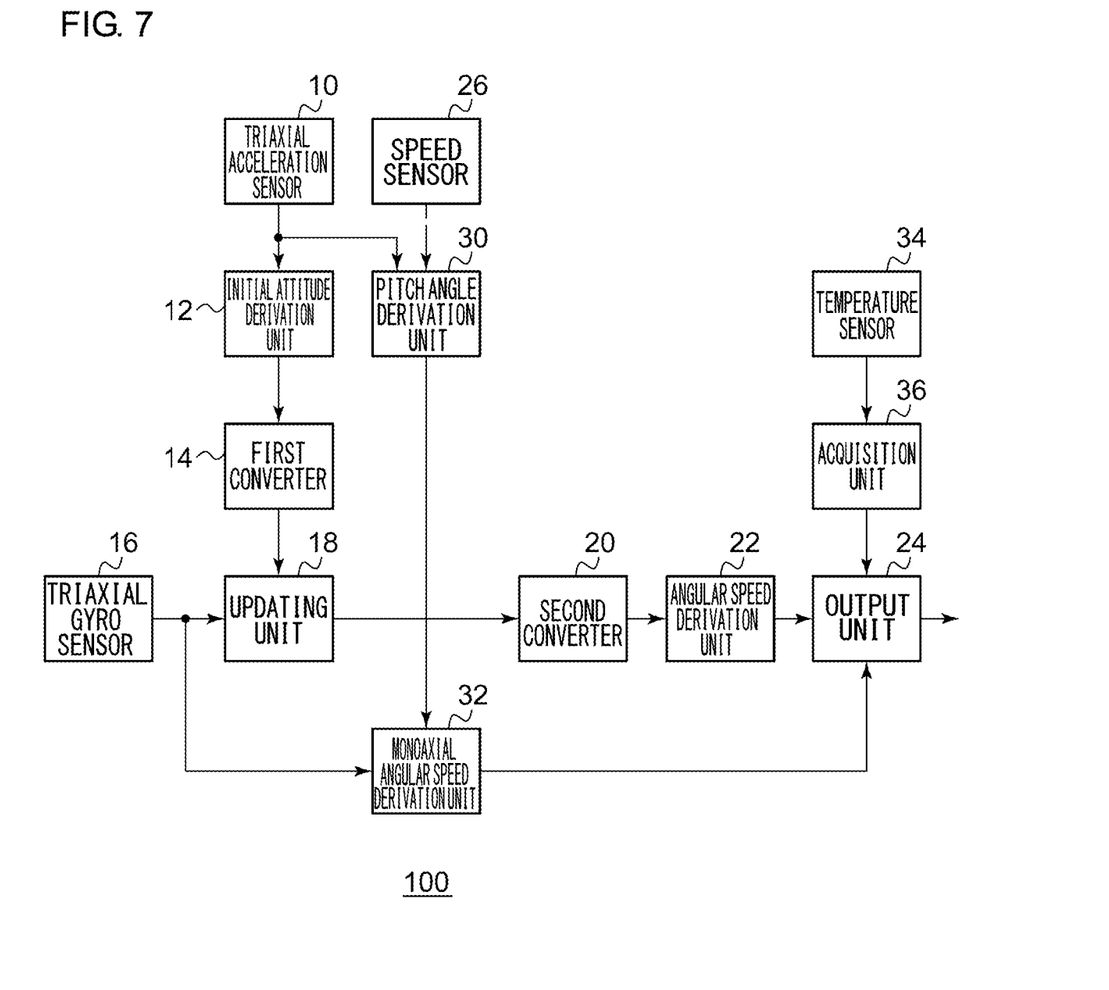
FIG. 7 shows a configuration of an angular speed derivation device according to Embodiment 3.

FIG. 7 shows a configuration of an angular speed derivation device 100 according to Embodiment 3. The angular speed derivation device 100 includes a triaxial acceleration sensor 10, an initial attitude derivation unit 12, a first converter 14, a triaxial gyro sensor 16, an updating unit 18, a second converter 20, an angular speed derivation unit 22, an output unit 24, a speed sensor 26, a pitch angle derivation unit 30, a monoaxial angular speed derivation unit 32, a temperature sensor 34, and an acquisition unit 36.

The temperature sensor 34 is implemented by, for example, a semiconductor temperature sensor and is provided in the triaxial gyro sensor 16 or the neighborhood thereof. In other words, the temperature sensor 34 detects the temperature of the triaxial gyro sensor 16 or the temperature around. This is equivalent to detecting the ambient temperature of the sensor mount in which the triaxial gyro sensor 16 is mounted. The detected temperature is output as, for example, an analog signal of 0V から 5V proportional to the temperature. The acquisition unit 36 receives the analog signal from the temperature sensor 34. This is equivalent to acquiring the temperature. The acquisition unit 36 is provided with an analog to digital (AD) converter and subjects the voltage value of the temperature sensor 34 to AD conversion at a sampling interval of, for example, 100 msec. The acquisition unit 36 outputs a digital signal resulting from AD conversion to the output unit 24.

The output unit 24 receives the temperature from the acquisition unit 36. The output unit 24 also receives the triaxial angular speed from the angular speed derivation unit 22 and receives the monoaxial angular speed from the monoaxial angular speed derivation unit 32. The output unit 24 derives the variation in the temperature after the initial attitude is derived by the initial attitude derivation unit 12. The output unit 24 outputs the triaxial angular speed when the variation in the temperature is smaller than a threshold value. Meanwhile, the output unit 24 outputs the monoaxial angular speed instead of the triaxial angular speed when the variation in the temperature is equal to or larger than the threshold value.

Figure 8:
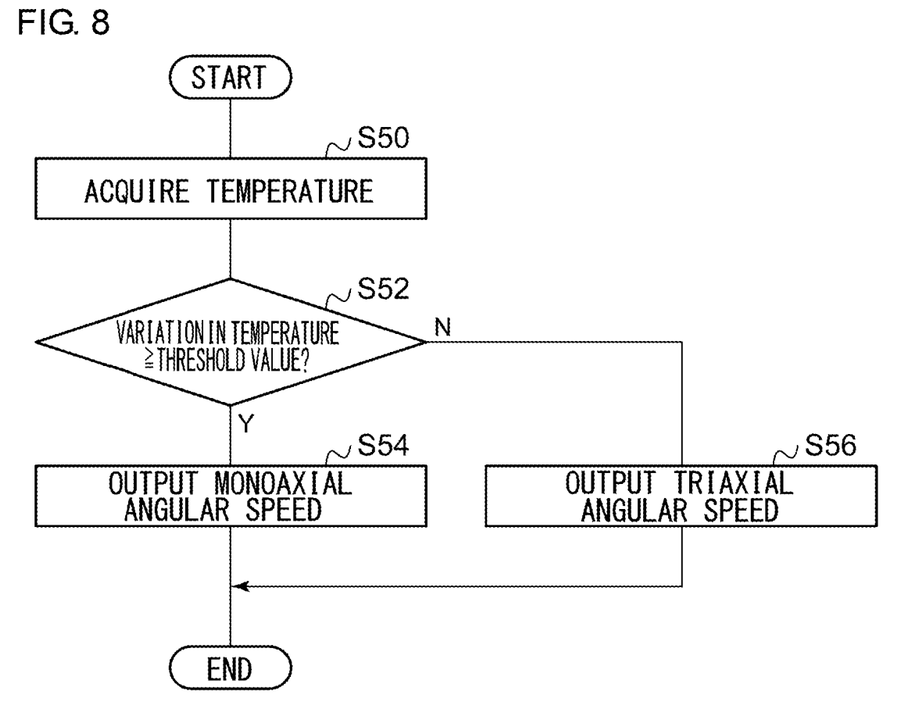
FIG. 8 is a flowchart showing steps for switching by the angular speed derivation device of FIG. 7.

A description will be given of the operation of the angular speed derivation device 100 having the above configuration. FIG. 8 is a flowchart showing steps for switching by the angular speed derivation device 100. The acquisition unit 36 acquires the temperature (S50). When the variation in the temperature is equal to or larger than a threshold value (Y in S52), the output unit 24 outputs the monoaxial angular speed (S54). When the variation in the temperature is not equal to or larger than the threshold value (N in S52), the output unit 24 outputs the triaxial angular speed (S56).

According to this embodiment, the temperature is compared with a threshold value so that an increase in an error in the gyro sensor caused by the variation in the environment is detected. Since the monoaxial angular speed is output instead of the triaxial angular speed when the temperature is equal to or higher than the threshold value, the output of triaxial angular speed affected by an error is avoided. Since the output of triaxial angular speed affected by an error is avoided, the accuracy of deriving the angular speed output is inhibited from becoming poor. Since the monoaxial angular speed is output, an error in the yaw angular speed caused by an error in the absolute attitude angle collected in the attitude is reduced.

Embodiment 4

A description will now be given of Embodiment 4. Like the foregoing embodiments, Embodiment 4 relates to an angular speed derivation device configured to derive an angular speed by using a triaxial gyro sensor. Like Embodiments 2 and 3, Embodiment 4 is directed to the purpose of reducing errors in the attitude angle collected as the attitude is updated and inhibiting the accuracy of deriving the yaw angular speed from becoming poor due to the errors. In the angular speed derivation device according to Embodiment 4, as in the device of Embodiments 2 and 3, the accuracy of deriving the angular speed is improved by selecting one of the two processes for deriving an angular speed that has a higher accuracy and performing the selected process. More specifically, a difference between the pitch angle of the attitude updated by the output value from the triaxial gyro sensor and the pitch angle calculated from the triaxial acceleration sensor and the speed sensor is derived. When the difference becomes equal to or larger than a threshold value, the angular speed derivation device outputs an angular speed derived from the output value of the monoaxial gyro sensor. A description will be given of the difference from the foregoing embodiment.

Figure 9:
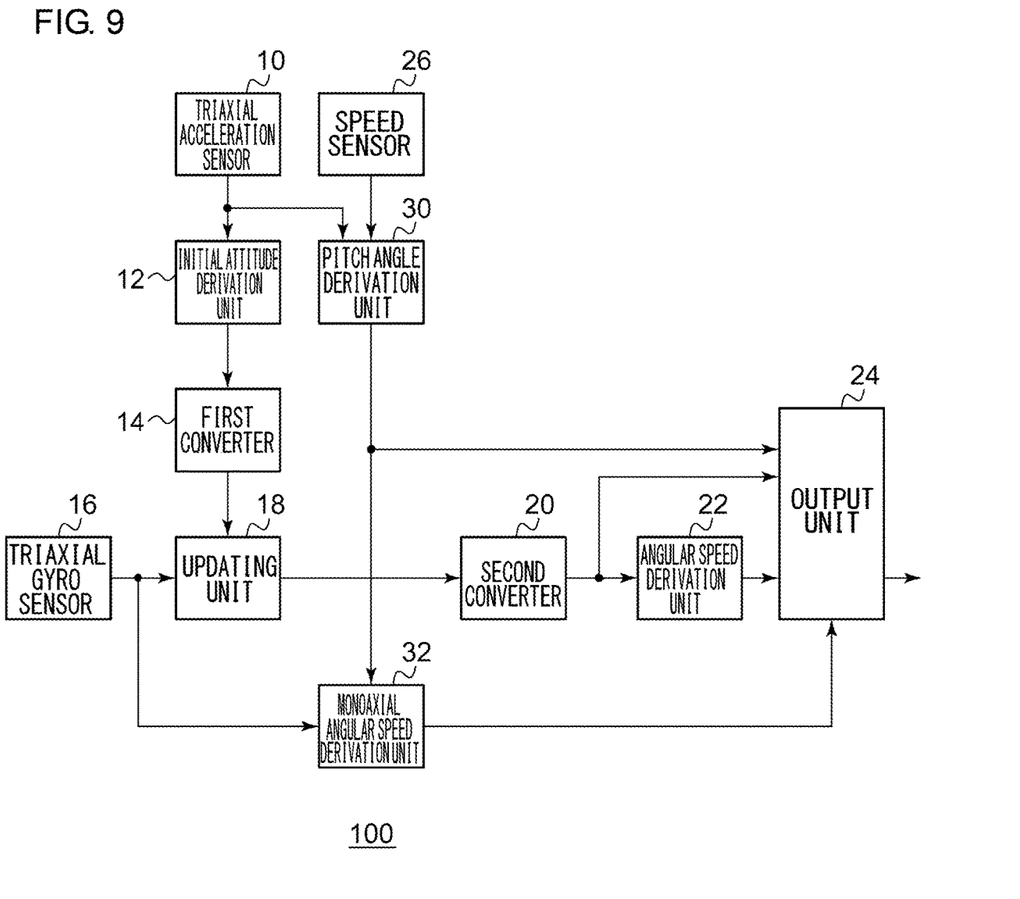
FIG. 9 shows a configuration of an angular speed derivation device according to Embodiment 4.

FIG. 9 shows a configuration of an angular speed derivation device 100 according to Embodiment 4. The angular speed derivation device 100 includes a triaxial acceleration sensor 10, an initial attitude derivation unit 12, a first converter 14, a triaxial gyro sensor 16, an updating unit 18, a second converter 20, an angular speed derivation unit 22, an output unit 24, a speed sensor 26, a pitch angle derivation unit 30, and a monoaxial angular speed derivation unit 32.

The pitch angle derivation unit 30 outputs the pitch angle θ to the monoaxial angular speed derivation unit 32 and also to the output unit 24. Of the attitude in the Euler angle representation, the second converter 20 outputs the pitch angle θ to the output unit 24. The output unit 24 receives the pitch angle θ from the second converter 20 (hereinafter, referred to as the "first pitch angle") and also receives the pitch angle θ from the pitch angle derivation unit 30 (hereinafter, referred to as the "second pitch angle"). After the initial attitude is derived by the initial attitude derivation unit 12, the output unit 24 derives a difference between the first pitch angle and the second pitch angle. When the difference is smaller than a threshold value, the output unit 24 outputs the triaxial angular speed. Meanwhile, when the difference is equal to or larger than the threshold value, the output unit 24 outputs the monoaxial angular speed instead of the triaxial angular speed.

Figure 10:
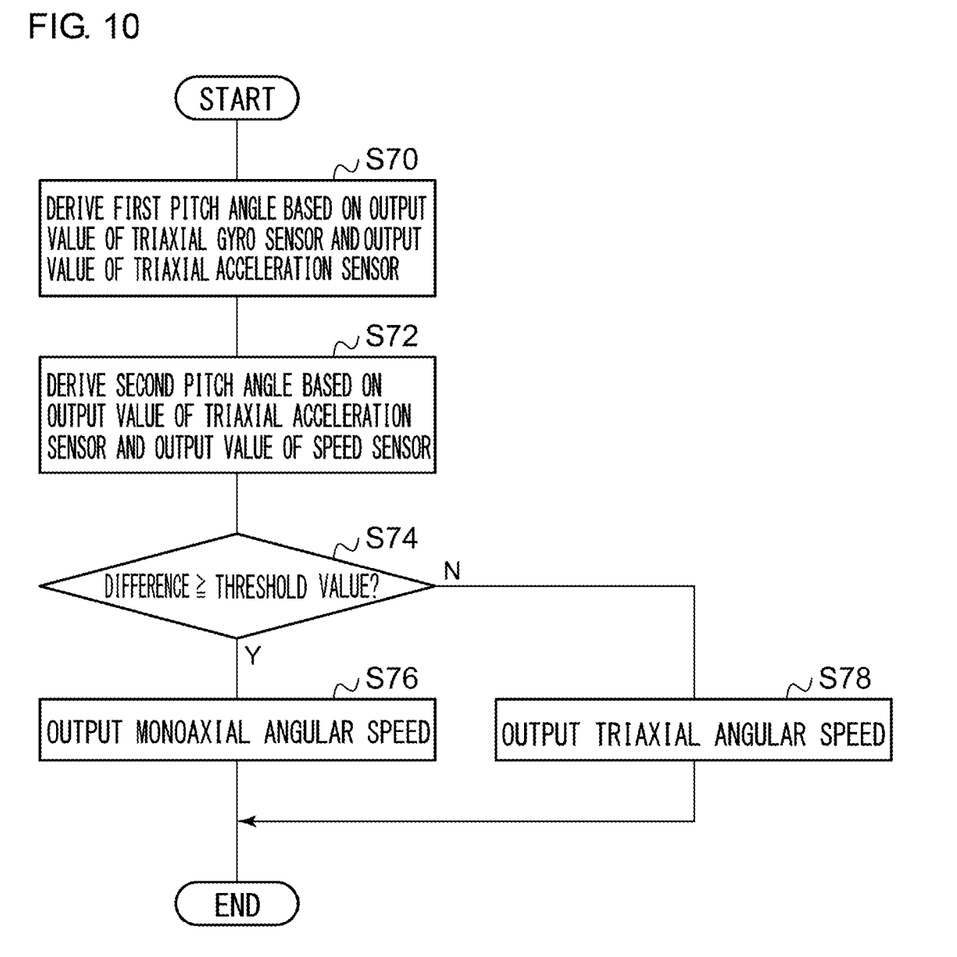
FIG. 10 is a flowchart showing steps for switching by the angular speed derivation device of FIG. 9.

A description will be given of the operation of the angular speed derivation device 100 having the above configuration. FIG. 10 is a flowchart showing steps for switching by the angular speed derivation device 100. The second converter 20 derives the first pitch angle based on the output value of the triaxial gyro sensor 16 and the output value of the triaxial acceleration sensor 10 (S70). The pitch angle derivation unit 30 derives the second pitch angle based on the output value of the triaxial acceleration sensor 10 and the output value of the speed sensor 26 (S72). When the difference between the first pitch angle and the second pitch angle is equal to or larger than a threshold value (Y in S74), the output unit 24 outputs the monoaxial angular speed (S76). When the difference between the first pitch angle and the second pitch angle is not equal to or larger than a threshold value (Y in S74), the output unit 24 outputs the triaxial angular speed (S78).

According to this embodiment, a difference between the first pitch angle and the second pitch angle is compared with a threshold value, wherein the first pitch angle is derived based on the output values of the triaxial gyro sensor 16 and the triaxial acceleration sensor 10 and the second pitch angle is derived based on the output values of the triaxial acceleration sensor 10 and the speed sensor 26. Therefore, an error in the absolute attitude angle is detected. Since the monoaxial angular speed is output instead of the triaxial angular speed when the difference is equal to or higher than the threshold value, the output of triaxial angular speed affected by an error is avoided. Since the output of triaxial angular speed affected by an error in the attitude is avoided, the accuracy of deriving the angular speed output is inhibited from becoming poor. Since the monoaxial angular speed is output, the impact from an error in the absolute attitude angle is reduced.

Described above is an explanation based on an exemplary embodiment. The embodiment is intended to be illustrative only and it will be understood by those skilled in the art that various modifications to constituting elements and processes could be developed and that such modifications are also within the scope of the present invention.

Arbitrary combinations of Embodiment 1 through Embodiment 4 are also useful. According to this variation, the combined benefits of Embodiments 1 through 4 are obtained.

What is claimed is:

1. An angular speed derivation device installed in an automobile, comprising:
   a first converter that converts an initial attitude in an Euler angle representation derived based on an output value of a triaxial acceleration sensor into an initial attitude represented by quaternion;
   an updating unit that updates an attitude represented by quaternion by defining the initial attitude represented by quaternion and derived from conversion in the first converter as an initial value, and repeatedly solving a differential equation of the attitude represented by quaternion by successively substituting output values of the triaxial gyro sensor into the differential equation;
   a second converter that converts the attitude represented by quaternion and updated by the updating unit into an attitude in the Euler angle representation;
   an angular speed derivation unit that derives an angular speed based on a time-dependent change in the attitude in the Euler angle representation derived from conversion in the second converter;
   an output unit configured to output the angular speed derived by the angular speed derivation unit; and
   a pitch angle derivation unit that derives a pitch angle based on the output value of the triaxial acceleration sensor and an output value of a speed sensor,
     wherein the output unit outputs an angular speed derived based on an output value of a monoaxial acceleration sensor, when a difference between the pitch angle derived by the pitch angle derivation unit and a pitch angle in the attitude in the Euler angle representation derived from conversion in the second converter is equal to or larger than a threshold value, and
     wherein the output unit outputs the angular speed derived by the angular speed derivation unit when the difference between the pitch angle derived by the pitch angle derivation unit and the pitch angle in the attitude in the Euler angle representation derived from conversion in the second converter is less than the threshold value.

2. The angular speed derivation device according to claim 1, wherein
   of a set of output values of the triaxial gyro sensor, an output value for one axis is selected and used as the output value of the monoaxial gyro sensor.

3. An angular speed derivation method adapted for an angular speed derivation device installed in an automobile, comprising:
   converting an initial attitude in an Euler angle representation derived based on an output value of a triaxial acceleration sensor into an initial attitude represented by quaternion;
   updating an attitude represented by quaternion by defining the initial attitude represented by quaternion and derived from conversion in the first converter as an initial value, and repeatedly solving a differential equation of the attitude represented by quaternion by successively substituting output values of the triaxial gyro sensor into the differential equation;
   converting the attitude represented by quaternion as updated into an attitude in the Euler angle representation;

deriving an angular speed based on a time-dependent change in the attitude in the Euler angle representation as derived;
and
deriving a pitch angle based on the output value of the triaxial acceleration sensor and an output value of a speed sensor, wherein the outputting outputs an angular speed derived based on an output value of a monoaxial gyro sensor, when a difference between the pitch angle derived based on the output value of the triaxial acceleration sensor and the output value of the speed sensor and a pitch angle in the attitude in the Euler angle representation derived from conversion is equal to or larger than a threshold value, and outputting the angular speed based on a time-dependent change in the attitude in the Euler angle representation when the difference between the pitch angle based on the output value of the triaxial acceleration sensor and the output value of the speed sensor and a pitch angle in the attitude in the Euler angle representation derived from conversion is less than the threshold value.

* * * * *